United States Patent
Waugh

(10) Patent No.: US 11,036,279 B2
(45) Date of Patent: Jun. 15, 2021

(54) APPARATUS AND METHOD FOR MANAGING A CACHE

(71) Applicant: Arm Limited, Cambridge (GB)

(72) Inventor: Alex James Waugh, Cambridge (GB)

(73) Assignee: Arm Limited, Cambridge (GB)

( * ) Notice: Subject to any disclaimer, the term of this patent is extended or adjusted under 35 U.S.C. 154(b) by 98 days.

(21) Appl. No.: 16/397,025

(22) Filed: Apr. 29, 2019

(65) Prior Publication Data

US 2020/0341536 A1    Oct. 29, 2020

(51) Int. Cl.
| | |
|---|---|
| *G06F 1/32* | (2019.01) |
| *G06F 1/3287* | (2019.01) |
| *G06F 12/0895* | (2016.01) |
| *G06F 1/3234* | (2019.01) |
| *G06F 1/28* | (2006.01) |

(52) U.S. Cl.
CPC .............. *G06F 1/3287* (2013.01); *G06F 1/28* (2013.01); *G06F 1/3275* (2013.01); *G06F 12/0895* (2013.01); *G06F 2212/1028* (2013.01)

(58) Field of Classification Search
None
See application file for complete search history.

(56) References Cited

U.S. PATENT DOCUMENTS

| | | | | |
|---|---|---|---|---|
| 2010/0274973 | A1* | 10/2010 | Balakrishnan | G06F 12/0846 711/130 |
| 2011/0093726 | A1* | 4/2011 | Worthington | G06F 1/3225 713/320 |
| 2015/0268711 | A1* | 9/2015 | Ramani | G06F 1/3203 713/320 |
| 2017/0255248 | A1* | 9/2017 | Crawford | G06F 1/3296 |

* cited by examiner

*Primary Examiner* — Fahmida Rahman
(74) *Attorney, Agent, or Firm* — Nixon & Vanderhye P.C.

(57) ABSTRACT

An apparatus and method are provided for managing a cache. The cache is arranged to comprise a plurality of cache sections, where each cache section is powered independently of the other cache sections in the plurality of cache sections, and the apparatus has power control circuitry to control power to each of the cache sections. The power control circuitry is responsive to a trigger condition indicative of an ability to operate the cache in a power saving mode, to perform a latency evaluation process to determine a latency indication for each of the cache sections, and to control which of a subset of the cache sections to power off in dependence on the latency indication. This can allow the power consumption savings realised by turning off one or more cache sections to be optimised to take into account the current system state.

20 Claims, 11 Drawing Sheets

LOOKUP TABLE

| | L3 SLICE 0 | L3 SLICE 1 | L3 SLICE 2 | L3 SLICE 3 | MASTER NODE |
|---|---|---|---|---|---|
| SLAVE NODE 0 | | | | | |
| SLAVE NODE 1 | | | | | |
| MASTER NODE | | | | | |

75

IF DIRECT TRANSFER FROM MASTER NODE TO SLAVE NODE SUPPORTED

LATENCY VALUE (COULD BE IN TERMS OF DISTANCE OR CLOCK CYCLES)

HIT LATENCY = LATENCY (SLAVE NODE → L3 CACHE SLICE) x 2

MISS LATENCY
(IF NO DIRECT TRANSFER SUPPORT) = [LATENCY (SLAVE NODE → L3 CACHE SLICE) x 2] + [LATENCY (L3 CACHE SLICE → MASTER NODE) x 2]

MISS LATENCY
(IF DIRECT TRANSFER SUPPORTED) = [LATENCY (SLAVE NODE → L3 CACHE SLICE)] + [LATENCY (L3 CACHE SLICE → MASTER NODE)] + [LATENCY (MASTER NODE → SLAVE NODE)]

FIG. 3

APPARATUS AND METHOD FOR MANAGING A CACHE

BACKGROUND

The present technique relates to an apparatus and method for managing a cache.

Caches are commonly used in data processing systems to temporarily store data for access by one or more associated data processing units, so as to facilitate quicker access to that data than would be the case if that data had to be accessed in main memory. The data stored in a cache can take a variety of forms, for example it may be data values manipulated by an associated data processing unit when performing data processing operations, and/or instructions used to define the data processing operations to be performed by the associated data processing unit.

Some caches used within a data processing system may be relatively large, and such caches can consume a large amount of leakage power when not in use. The extent to which the available capacity of the cache is utilised will vary dependent on the current workload of the system in which the cache is used. For example, some workloads may operate on relatively small sets of data, and in such situations the cache may be larger than is strictly necessary to service the workload effectively. In such instances, the relatively large leakage power of the cache can reduce the overall energy efficiency of the system. As another example where the leakage power can be of concern, some workloads may be background tasks that are not performance critical, and hence for which it may be more desirable to perform those tasks with lower energy consumption than running those tasks at maximum performance.

Hence, it will be appreciated that whilst in some instances the use of a relatively large cache can give rise to significant performance improvements, there are situations where the workload of the system is such that the cache is either lightly utilised, or the performance benefits arising from the relatively large cache are not required, and in those instances the leakage power is of concern, since it reduces the overall energy efficiency of the system. It would hence be desirable to provide an improved mechanism for managing the cache so as to seek to alleviate the leakage power issue.

SUMMARY

In one example arrangement, there is provided an apparatus comprising: a cache comprising a plurality of cache sections, where each cache section is powered independently of the other cache sections in said plurality of cache sections; and power control circuitry to control power to each of the cache sections; wherein the power control circuitry is responsive to a trigger condition indicative of an ability to operate the cache in a power saving mode, to perform a latency evaluation process to determine a latency indication for each of the cache sections, and to control which of a subset of the cache sections to power off in dependence on the latency indication.

In another example arrangement, there is provided a method of managing a cache comprising: arranging the cache as a plurality of cache sections, where each cache section is powered independently of the other cache sections in said plurality of cache sections; employing power control circuitry to control power to each of the cache sections; and responsive to a trigger condition indicative of an ability to operate the cache in a power saving mode, performing a latency evaluation process to determine a latency indication for each of the cache sections, and causing the power control circuitry to control which of a subset of the cache sections to power off in dependence on the latency indication.

In a still further example arrangement, there is provided an apparatus comprising: cache means for providing a plurality of cache sections, where each cache section is powered independently of the other cache sections in said plurality of cache sections; and power control means for controlling power to each of the cache sections; wherein the power control means, responsive to a trigger condition indicative of an ability to operate the cache means in a power saving mode, for performing a latency evaluation process to determine a latency indication for each of the cache sections, and for controlling which of a subset of the cache sections to power off in dependence on the latency indication.

BRIEF DESCRIPTION OF THE DRAWINGS

The present technique will be described further, by way of illustration only, with reference to examples thereof as illustrated in the accompanying drawings, in which:

FIG. 3 illustrates an example of the lookup table shown in FIG. 1A, in accordance with one example arrangement;

DESCRIPTION OF EXAMPLES

Figure 1A:
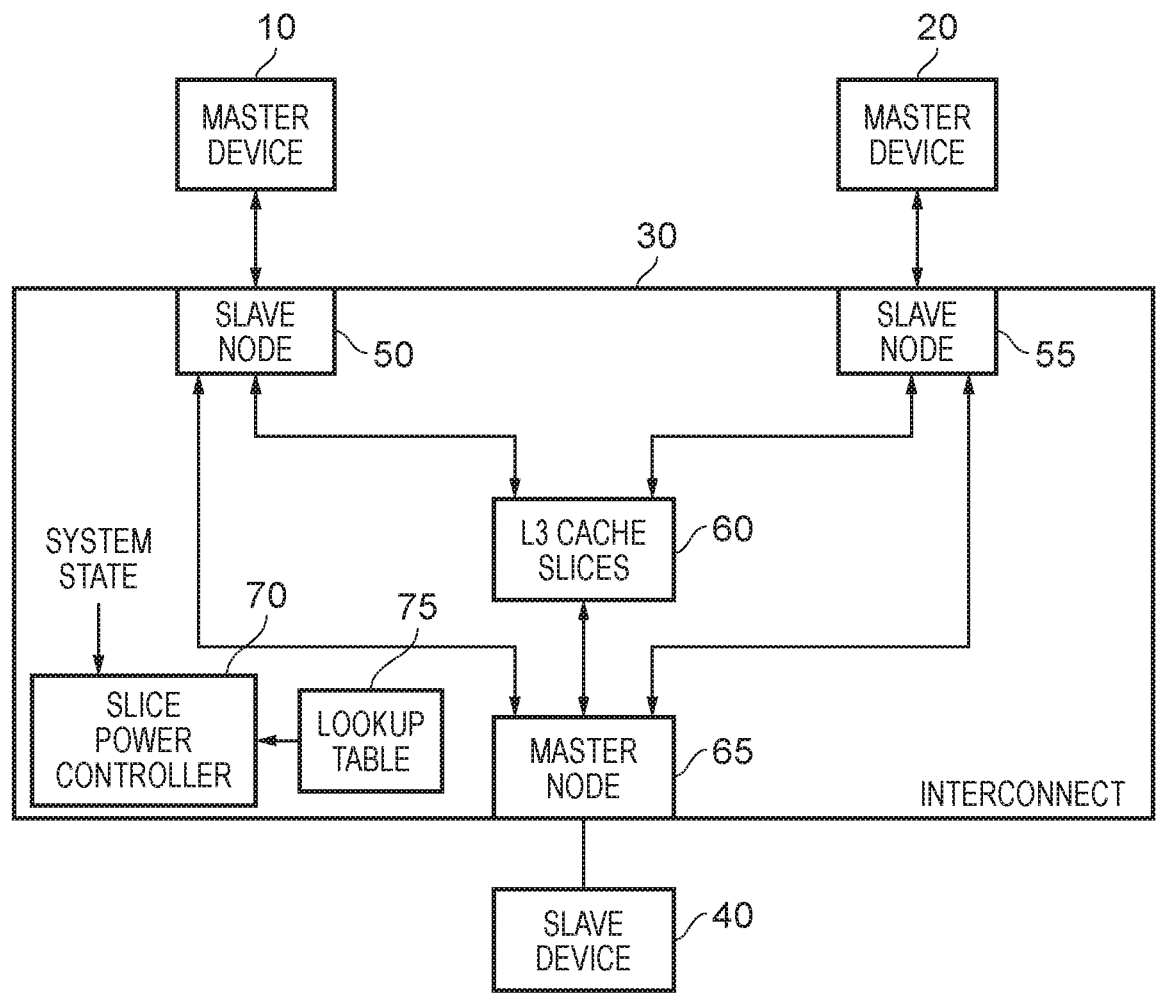
FIG. 1A is a diagram schematically illustrating an interconnect in accordance with one example arrangement.

In accordance with the techniques described herein, an apparatus is provided that has a cache that is arranged to consist of a plurality of cache sections. Each cache section is arranged to be powered independently of the other cache sections. Power control circuitry is then provided to control power to each of the cache sections. Hence, it is possible to power off one or more of the cache sections, thereby reducing the amount of leakage power, and thereby reducing the power consumption of the cache. This in turn can lead to energy consumption savings in association with the cache.

However, the techniques described herein do not merely facilitate the turning off of one or more cache sections, but provide a mechanism for determining which cache sections are most appropriate to turn off in order to seek to improve the power consumption savings achievable and/or reduce the performance impact associated with turning off one or more of the cache sections. In particular, the power control circuitry is arranged so that, in response to a trigger condition indicative of an ability to operate the cache in a power saving mode, a latency evaluation process is performed to determine a latency indication for each of the cache sections. The power control circuitry then controls which of a subset of the cache sections to power off in dependence of the latency indication.

In particular, the inventor realised that the multiple cache sections forming the cache will be physically separated from each other, and hence will have different latency indications when considering the various elements of the system that will interact with those cache sections. For example, considering a data processing unit that may be arranged to access the cache, the physical placement of the different cache sections within the system may be such that the latency associated with an access by that data processing unit to the cache may depend on which cache section is accessed. Similar considerations may apply to any slave device that is accessed following a miss within the cache, since again the latency associated with a communication between the cache and such a slave device may depend on the cache section that is involved in that communication.

However, in accordance with the technique described herein, the above mentioned latency evaluation process can be performed in order to take such latency considerations into account when deciding which cache section or cache sections to power off. This enables the determination as to which cache sections are powered off to be made so as to seek to reduce the performance impact resulting from partially powering off the cache, and/or seek to maximise the amount of power saving that can be achieved by turning off a part of the cache.

The latency indication can be expressed in a variety of ways. For example, it may be expressed in terms of a physical path length between a cache section and one or more components with which that cache section may interact, or may be expressed in terms of the clock cycles taken to communicate between that cache section and those one or more components. Such a latency indication can also be used as a proxy for the power consumption cost associated with an access to a particular cache section, in that as the latency increases the power consumption will also typically increase.

In one example implementation, the above technique can be used in situations where the cache is associated with a single data processing unit. Power consumption savings can still be realised in such an implementation by employing the latency evaluation process described herein. Further, in some instances the choice of which cache sections to power off in the power saving mode may still vary dynamically, for example in implementations where the manner in which the latency indication is computed depends on the hit rate observed for the cache. For example, dependent on the hit rate, it may be determined that the latency indication should be that associated with a hit in the cache, that associated with a miss in the cache, or a latency indication that takes into account both the hit latency and the miss latency, and in such instances the most appropriate cache sections to power off may depend on which form of latency indication is determined.

Whilst as mentioned above the technique can be used in situations where the cache is used by a single data processing unit, in one example implementation the cache is accessible to a plurality of data processing units. In such an implementation, the power control circuitry may be arranged to take into account which of the plurality of data processing units are active when determining the latency indication for each of the cache sections. Hence, in such an implementation, the above described process can dynamically take into account which data processing units are active at the time the trigger condition occurs, enabling the choice of cache sections that are to be powered off to be made taking into account the data processing units that will be seeking to access the cache. This enables the latency evaluation process to seek to optimise the power consumption savings achieved, taking into account the current state of the system in which the cache is being used.

There are a number of ways in which the latency indication for each cache section can be determined in situations where more than one data processing unit is active, but in one example arrangement the power control circuitry is arranged to determine, as the latency indication for each of the cache sections, an average latency indication for each cache section taking into account a latency indication for that cache section for each active data processing unit. Hence, the average latency indications can be determined and then compared in order to decide which cache sections to power off. For example, those with the largest average latency indication can be powered off, with the aim of seeking to maximise the power consumption savings achieved, whilst keeping a chosen number of cache sections active.

In one example arrangement, during the latency evaluation process the power control circuitry is arranged to determine the latency indication for each cache section taking into account at least one of a hit latency indication and a miss latency indication for that cache section. The hit latency indication can be computed, for example, based on a round trip path between the requestor (for example the data processing unit) that issues the request for data and the relevant cache section, assuming a hit occurs within that cache section. Similarly, a miss latency indication can be determined, for example, based on a round trip path in a situation where the request misses in the cache section, and accordingly needs to be propagated on to a lower level of memory in order to access the data required.

It should be noted that the latency indications, whether a hit latency indication or a miss latency indication, do not need to express the latency in absolute terms, but instead may merely provide comparative values that can be compared for each of the cache sections. For instance, as will be discussed in more detail later with reference to a specific example, the cache may reside within an interconnect, and each cache section may be coupled to one or more slave nodes and one or more master nodes within the interconnect. The latency indications can be computed with reference to those master and slave nodes, rather than taking into account the ultimate data processing unit that issues the request, or the ultimate slave device that will handle a cache miss.

In some instances, both the hit latency indication and the miss latency indication can be taken into account for each cache section. For example, during the latency evaluation process, the power control circuitry may be arranged to determine, as the latency indication for at least one cache section, a weighted latency indication for that cache section that is based on both the hit latency indication and the miss latency indication for that cache section. The weighting used in the weighted latency indication can take a variety of forms. For example, in one implementation the weighting between the hit latency indication and the miss latency indication may be fixed. However, in an alternative implementation that weighting may be dependent on a hit rate observed for the cache. In situations where more than one data processing unit may access the cache, then the hit rate can take a variety of forms. For example, in one implementation it may be an overall hit rate observed when using the cache, i.e. a hit rate that is not data processing unit specific. However, in an alternative implementation the hit rate used when determining the weighting may be dependent on the data processing unit being considered at that point.

Further, it should be noted that whilst a weighted latency indication may be used for one or more of the cache sections, a weighted latency indication may not be used for all of the cache sections. For example, where average hit latency indications and average miss latency indications are computed, it may be that for at least one cache section its average hit latency indication and average miss latency indication is the same, and in that case there is no need to compute a weighted latency indication, and instead the hit latency indication, or the miss latency indication, can be used as the overall latency indication for that cache section.

In one example arrangement, the power control circuitry may be arranged to determine whether to take into account the hit latency indication, the miss latency indication, or both the hit latency indication and the miss latency indication, dependent on a hit rate observed for the cache. Hence, the hit rate can be used to determine the type of latency indication determined for each cache section when performing the latency evaluation process. Thus, by way of example, if the hit rate is relatively high, it may be considered to be appropriate to merely take the hit latency indication into account when producing latency indications for each cache section. Conversely, if the hit rate is relatively low, it may be considered more appropriate to merely take the miss latency indication into account when determining the latency indication for each cache section. However, in the middle ground between those two extremes, it may be determined appropriate to consider both the hit latency indication and the miss latency indication when computing the latency indication for each cache section.

In another example arrangement, the power control circuitry may be arranged, when determining the latency indication for each cache section, to take into account both the hit latency indication and the miss latency indication for that cache section when the hit latency indication differs from the miss latency indication. As mentioned earlier, such an approach may be useful for example in situations where multiple data processing units access the cache, and average hit and miss latency indications are computed taking into account the various data processing units that are active.

There are a number of ways in which the latency indications can be determined when performing the latency evaluation process. For example, the latency indication could be computed on the fly during the performance of the latency evaluation process if desired. However, in one example arrangement the apparatus further comprises a storage that is arranged to store a latency value indicative of a latency between each cache section and each of the plurality of data processing units. In such an implementation, the power control circuitry may be arranged to reference the storage when determining the latency indication for each of the cache sections. In particular, the appropriate latency values can be accessed within the storage when determining the latency indication for each cache section.

It should be noted that the latency values stored in the storage do not need to be absolute values identifying latency, but instead merely need to be comparative values that can be compared against each other when considering different cache sections and different data processing units. In one example arrangement, the cache is provided within an interconnect providing a plurality of slave nodes, where each data processing unit is connected to an associated slave node. The storage is then arranged to store, as the latency value indicative of the latency between a cache section and a data processing unit, a value indicating the latency between that cache section and the slave node to which that data processing unit is connected. Such an approach allows for comparative assessment of the latency indications determined for each of the cache sections without needing to take into account the common path length portion between a data processing unit and its associated slave node.

In one example implementation the interconnect further comprises a master node to couple the interconnect to a slave device used to process a miss request from the cache. The storage may then be arranged to store a latency value indicative of a latency between each cache section and the master node, and the power control circuitry may be arranged to reference the storage to take into account, when determining a miss latency indication associated with a cache section and a data processing unit, both the latency value indicative of the latency between that data processing unit and that cache section and the latency value indicative of the latency between that cache section and the master node. Hence, by capturing information about the latency between each cache section and the master node, this again allows comparative latency indications to be produced for each cache section, even in instances where the miss latency indication is also utilised.

In some implementations, in the event of a miss, the data that is ultimately accessed by the master node may be routed back via the cache section. In that instance, it will be appreciated that the latency indication is determined based on an indication of the latency from the data processing unit to the cache section, from the cache section to the master node, from the master node back to the cache section, and from the cache section back to the data processing unit.

However, in an alternative implementation the interconnect may provide a direct path from the master node to each slave node for the provision of data obtained by the master node following a cache miss in the cache. In such an implementation the storage may be arranged to store a latency value indicative of the latency of each direct path. Accordingly, the power control circuitry may then be arranged to reference the storage to take into account, when determining the miss latency indication associated with a cache section and a data processing unit, the latency value indicative of the latency between that data processing unit and that cache section, the latency value indicative of the latency between that cache section and the master node, and the latency value indicative of the latency of the direct path provided for that data processing unit.

The trigger condition can take a variety of forms, but in one example implementation the trigger condition identifies that a transition should be made from operating the cache in a current mode to operating the cache in the power saving mode, where the number of cache sections to be employed differs between the current mode and the power saving mode. Depending on the current mode, there may be a need to reduce the number of cache sections when transitioning to the power saving mode, or to increase the number of cache sections when transitioning to the power saving mode.

In one example arrangement the current mode may be a mode in which all of the cache sections are powered up, in which case a transition to the power saving mode will result in a reduction in the number of cache sections to be powered. However, alternatively the current mode may also be a power saving mode where at least one cache section is powered off, and the determination as to whether the number of cache sections powered needs to be increased or decreased when transitioning to the power saving mode will depend on the power saving state of the current mode versus the power saving state of the power saving mode being transitioned to.

In one particular example implementation, in the current mode all cache sections are powered on, and in the power saving mode only one cache section is powered on. The power control circuitry is then arranged to perform the latency evaluation process to determine which cache section to remain powered on in the power saving mode. Hence, the apparatus can support a mode where all of the cache sections are powered on, but may also support a power saving mode where only one cache section is left powered on. It has been found that such an implementation can be very useful in a variety of use cases since it allows a very significant reduction in the power consumption, whilst also providing sufficient cache capacity for a variety of workload scenarios.

In another example arrangement, the cache may already be operating in the power saving mode at the time the trigger condition occurs, and the trigger condition may occur due to a change in system state indicating that the power control circuitry should re-perform the latency evaluation process in order to determine whether to make a change to the cache sections forming the subset of the cache sections that are powered off in the power saving mode. For instance, some changes in system state may occur that still indicate that it is appropriate to operate the cache with the same number of cache sections powered, but it may be that the selection of cache sections is no longer optimal taking into account the changes in the system that have occurred. For example, one processing unit may be powered down whilst another is powered up, or a workload may be transferred from one processing unit to another, and in those instances it may be appropriate to re-perform the latency evaluation process in order to determine the most optimal cache sections to be powered on.

In one example arrangement, the power control circuitry is arranged to determine, at least in the presence of a qualifying condition, to make the change to the selection of cache sections that are to be powered off when re-performance of the latency evaluation process identifies that a latency reduction can be achieved by making the change. Hence, where it is indicated that a latency reduction can be achieved by making the change, then this indicates a situation where it may be appropriate to alter the cache sections that are powered. However, as mentioned above, it may be determined appropriate to only do this in the presence of a qualifying condition. For example, the power control circuitry may have access to cost information indicative of a cost associated with performing the change, and in that instance the qualifying condition may be determined to be present when the cost is below a threshold. The cost can be measured in a variety of different ways. For example, there will be power consumed in powering off one or more cache sections and powering up one or more cache sections in order to make the required change to the constellation of cache sections that are powered. In addition, the power control circuitry may have access to some information indicative of the length of time the current system state is likely to persist, information indicative of the frequency with which the cache will be accessed, etc, and all of these factors can be taken into account when determining whether the power consumed in making the change is likely to be recouped by the power consumption saving achieved once the change has been made.

In one implementation, the threshold cost that is considered is dependent on the latency reduction that can be achieved by making the change. Hence, as the latency reduction increases, then the cost threshold may be increased, since it may be considered that the larger latency reduction is likely to allow that switch cost to be recouped more readily.

The cache can take a variety of forms, but in one example implementation is an N-way set associative cache, and each cache section comprises a plurality of sets, where each set comprises an entry in each of the N ways. Hence, each cache section will include entries from each of the ways within the N-way set associative cache.

Particular examples will now be described with reference to the Figures.

FIG. 1A is a block diagram illustrating a system that incorporates an interconnect, where that interconnect includes a cache that can be managed using the techniques described herein. In particular, the interconnect 30 includes a cache 60 that is formed as a plurality of cache sections, also referred to herein as cache slices. Each cache slice may be powered independently of the other cache slices, with a slice power controller 70 being used to control the power supply to each cache slice. In FIG. 1A, the cache is denoted as a level 3 (L3) cache, since in this example it is assumed that the various master devices may also include one or more levels of local cache, in particular in this example it being assumed that level 1 and level 2 caches may be associated with at least some of the master devices connected to the interconnect. However, it will be appreciated that the techniques described herein can be applied to any suitable level of cache, and there is no requirement for the cache to be a L3 cache.

As shown in FIG. 1A, a number of master devices 10, 20 may be connected to associated slave nodes 50, 55 within the interconnect 30. Similarly, one or more slave devices 40 may be coupled to the interconnect via an associated master node 65. Whilst for simplicity of illustration the example of FIG. 1A merely shows two master devices and one slave device connected to the interconnect, it will be appreciated that the number of master devices and slave devices connected to any particular interconnect will vary dependent on the implementation, and in some implementations there could be significantly more master devices and slave devices connected to the interconnect.

Also, whilst in FIG. 1A the master node 65 is shown as being coupled to a single slave device 40, in some implementations the slave device 40 may be significantly more complex than a single device. For example, the master devices 10, 20 and associated interconnect 30 may form a cluster, and the master node 65 may be used to connect that cluster to a further interconnect which is then coupled to one or more further clusters.

As shown in FIG. 1A, the various slave nodes 50, 55 and master nodes 65 can be connected to the cache slices forming the cache 60. Hence, for a cacheable access request issued by one of the master devices 10, 20, the associated slave nodes 50, 55 can forward that request on to the level 3 cache 60. In particular, each slave node may use an address mapping to determine, based on the address specified by the access request, which cache slice to direct the request to, and to route that request to the appropriate cache slice. In the event of a hit within the cache 60, the requested data can be accessed directly in the cache, but in the event of a miss the request may be propagated on from the relevant cache slice of the cache 60 to the master node 65 for routing to the appropriate slave device 40 for processing.

When a response to that request is subsequently received from the slave device at the master node 65, then that response can be re-routed back to the cache 60. At that point, the response may then be returned from the cache 60 to the originating slave node 50, 55, i.e. the slave node that issued the original request.

As also shown in FIG. 1A, communication may be possible directly between a slave node 50, 55 and a master node 65, to enable one or more communications to bypass the cache slices 60. For non-cacheable access requests, this would for example allow a request to be propagated straight from the slave node to the master node. Further, in some instances, for a cacheable access request that has missed within the cache 60, it may be possible to route the response directly from the master node 65 back to the appropriate slave node 50, 55.

Figure 1B:
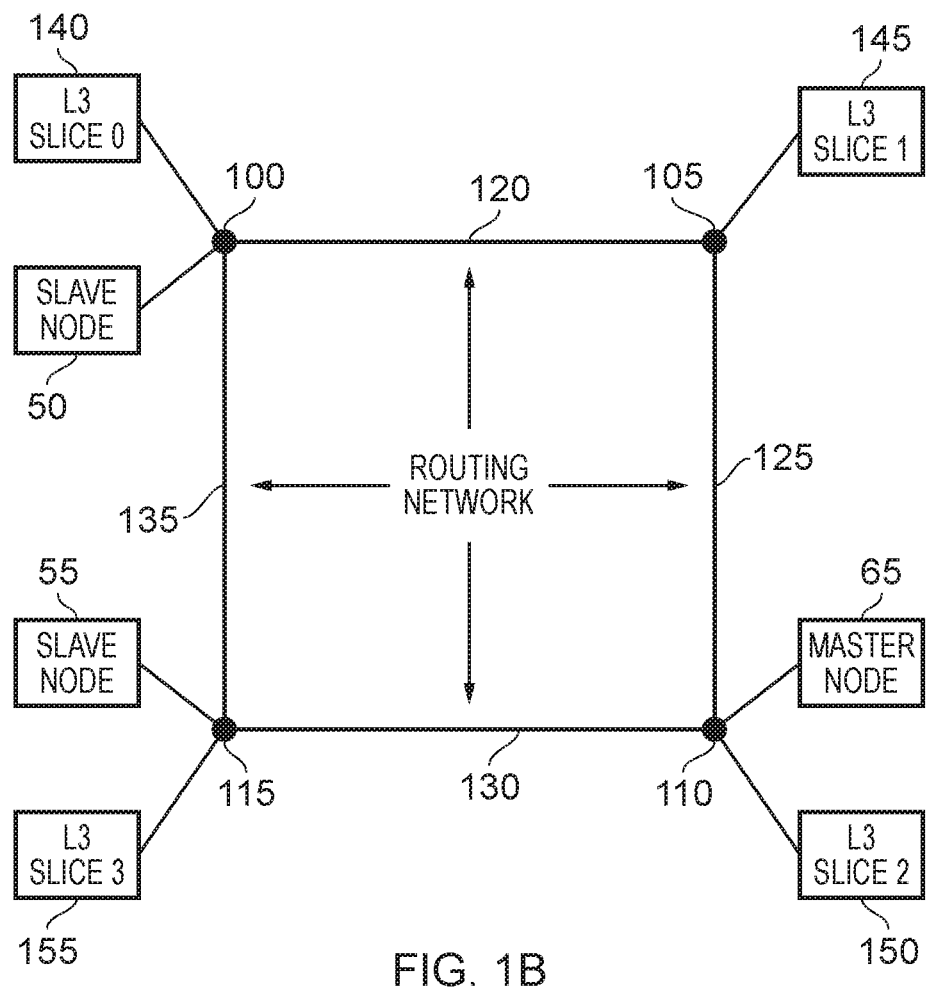
FIG. 1B is a diagram schematically illustrating an interconnect in accordance with one particular arrangement.

The various bidirectional lines shown within the interconnect 30 of FIG. 1A are intended to schematically illustrate the routing network within the interconnect used to connect together the various slave nodes, master nodes and cache slices provided within the interconnect. The manner in which the various communication paths are implemented to provide the routing network will vary dependent on implementation. FIG. 1B illustrates one example implementation where the routing network is provided by a ring structure formed of the paths 120, 125, 130, 135. The various slave nodes, master nodes, and cache slices forming the cache are provided at the intersections between the paths forming the ring as illustrated in FIG. 1B. Hence, considering the example of FIG. 1A, and assuming the cache 60 is formed of four cache slices, the various master nodes, slave nodes and level 3 cache slices may be connected to the ring network as shown in FIG. 1B. Hence, the slave node 50 may be connected to the point 100, the slave node 55 may be connected to the point 115 and the master node 65 may be connected to the point 110. Also, in the illustrated example, each level 3 cache slice 140, 145, 150, 155 is connected to one of the intersection points 100, 105, 110, 115 within the ring network. However, it will be appreciated that there may be a number of further nodes provided within an interconnect, and in that event the number of connecting paths used to form the ring would increase.

The ring may be formed as a unidirectional ring, where all communications pass in the same direction, i.e. clockwise or anticlockwise, or alternatively may be formed as a bidirectional ring where communications can pass in either direction, i.e. clockwise and anticlockwise. The various communication paths 120, 125, 130, 135 shown in FIG. 1B may actually be used to provide multiple channels of communication, and for each channel there may be in some instances a single direction of transmission around the ring. Hence, for example, requests may be propagated clockwise within a request communication channel, whilst responses may be propagated anticlockwise within one or more response channels.

From FIG. 1B, it will be appreciated that the latency associated with communication between a slave node and a level 3 cache slice, or between a level 3 cache slice and a master node, will vary dependent on which cache slice is being accessed, and the direction in which the communication propagates around the ring network. As will be discussed in more detail herein, the slice power controller 70 used to control the power to each of the cache slices can receive certain system state information, and that system state information can under certain conditions be used to cause a latency evaluation trigger to occur, causing the slice power controller 70 to perform a latency evaluation process in order to determine a latency indication for each of the cache slices within the cache 60. This can then be used to power off one or more of the cache slices taking into account those latency indications. Using the latency indication information for each cache slice, it is possible then to power off slices having the largest latency. This is likely to increase the power consumption savings achieved by powering off a certain number of slices, and can also reduce the performance impact that occurs as a result of turning off those slices.

Hence, under conditions where it is decided that not all of the cache slices need to be active, one or more of the cache slices can be turned off in order to reduce leakage power from the cache, by performing the latency evaluation process in order to determine which cache slices to turn off, and determining the cache slices to remain powered on so as to choose as those cache slices the cache slices with the lowest latency. This can then enable the optimal power consumption reduction to be achieved when turning off a certain number of cache slices, whilst also mitigating the performance impact of turning that number of cache slices off.

Figure 1C:
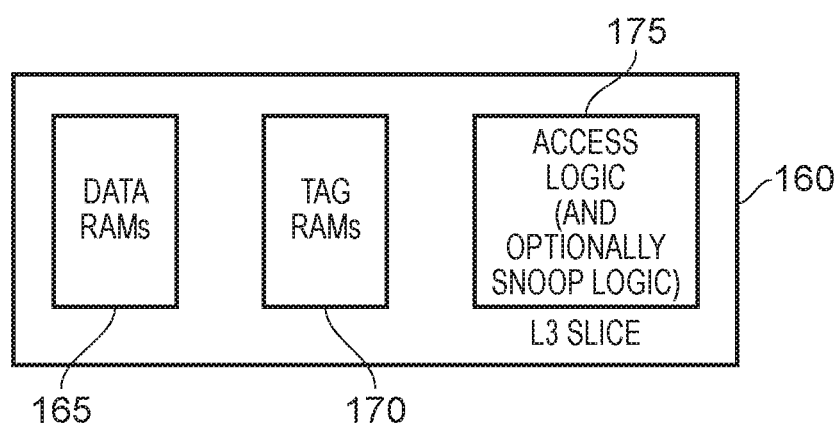
FIG. 1C schematically illustrates components provided within each level 3 cache slice in accordance with one example arrangement.

As shown in FIG. 1C, each cache slice will typically include one or more tag RAMs (Random Access Memories) 170 and one or more data RAMs 165. For example, the cache may be organised as an N-way set associative cache, with each data RAM being used to provide one of the ways of the cache, and comprising a plurality of cache lines in which to store data. For each data RAM, a corresponding tag RAM can be provided having an entry for each cache line in the data RAM. That entry can be used to store address information that is used to determine whether a hit is detected within the associated cache line, and certain other control information such as valid flags, dirty flags, etc. The valid flag will identify whether the content in the corresponding cache line is valid, whilst setting of the dirty flag will identify that that content is more up-to-date than the version held in main memory.

As also shown in FIG. 1C, each cache slice 160 will also typically include the access logic 175 used to control access to the associated tag RAMs 170 and data RAMs 165. Optionally, the cache slice can also include associated cache coherency circuitry (also referred to herein as snoop logic) used to perform cache coherency operations in order to ensure that any cached copies of the data held locally by the master devices are kept coherent. For addresses that map to the particular cache slice, the associated snoop logic within that cache slice can then be used to perform the required coherency operations.

Figure 2:
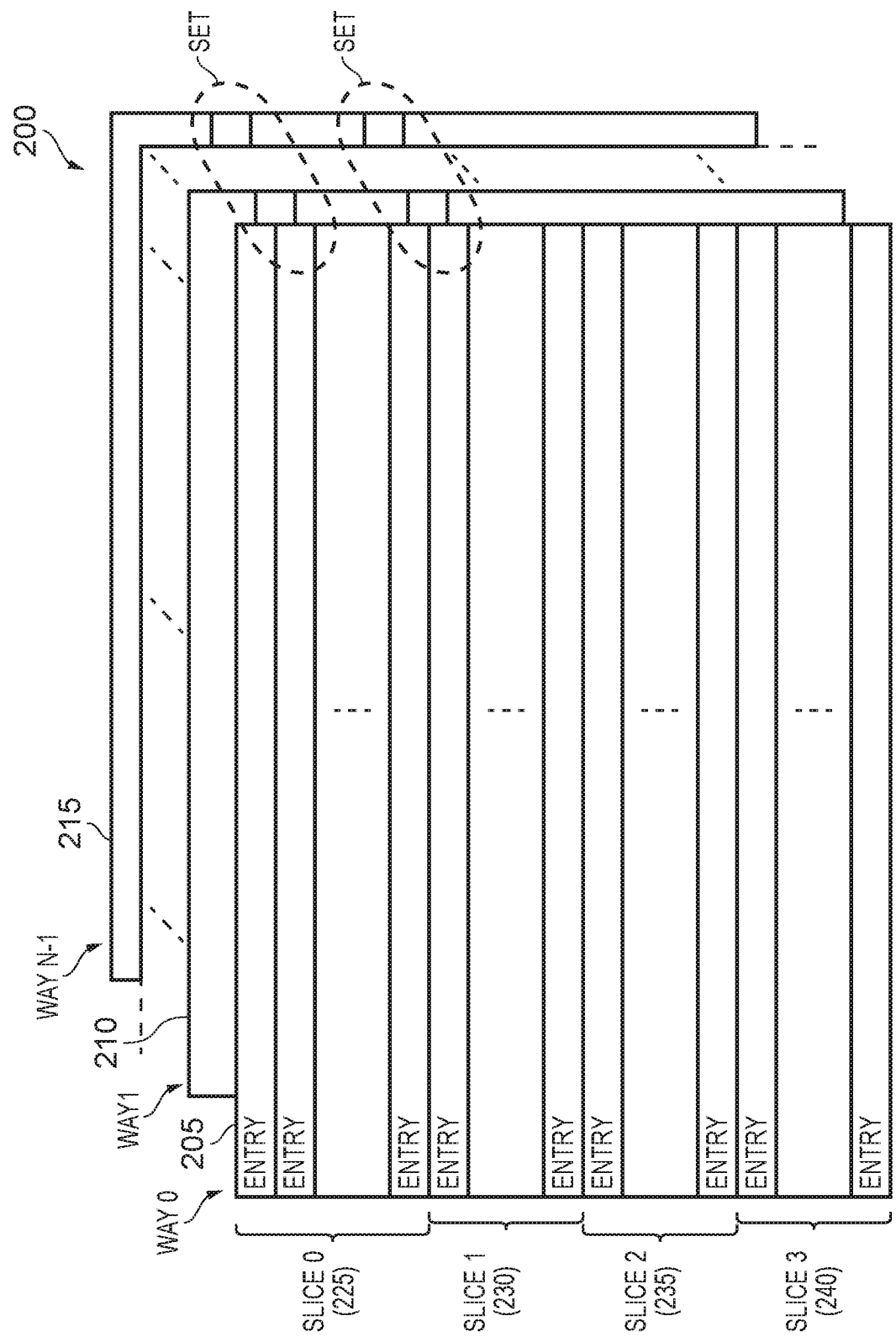
FIG. 2 schematically illustrates an N-way set associative cache, and how such a cache may be arranged as a plurality of cache slices in accordance with one example arrangement.

There are a number of ways in which the cache 60 can be split amongst the various cache slices, but FIG. 2 illustrates one example arrangement, considering the earlier-mentioned example of an N-way set associative cache. In FIG. 2, the cache 200 is organised as a plurality of ways 205, 210, 215, where each way includes a plurality of entries. For ease of illustration, the separate tag and data RAMs are not shown, and accordingly each entry can be considered to comprise the tag entry in the tag RAM and the associated cache line entry within the data RAM. As schematically shown in FIG. 2, each set is formed of one entry in each of the ways 205, 210, 215.

In the example shown in FIG. 2, the cache is considered to comprise of four slices 225, 230, 235, 240, where each slice includes a plurality of entries from each of the ways. Accordingly, it can be seen that each slice comprises multiple sets of the N-way set associative cache.

Whilst the cache slices 60 may be logically addressed or physically addressed, in one example implementation they are physically addressed. Whilst addresses may be linearly mapped to slices, in other implementations other schemes could be used, for example hashing of certain address bits could be performed in order to determine which slice to access for a particular address.

There are a number of ways in which the slice power controller 70 can determine the latency indication for each cache slice when performing the latency evaluation process, but in one example arrangement has access to a lookup table 75 when performing the latency evaluation process, in order to enable it to determine the latency indication information. The lookup table can be arranged in a variety of ways, but in one example is arranged as shown in FIG. 3. As shown in FIG. 3, for each cache slice, a latency value can be specified for each of the slave and master nodes. Hence, by way of example with reference to the first column in the table, for a communication between slave node 0 and L3 cache slice 0, a latency value will give an indication of the latency associated with that communication. Corresponding latency values can also then be specified for communications between the L3 cache slice 0 and slave node 1, and between the L3 cache slice 0 and the master node. Corresponding latency values can then also be provided for each of the other cache slices, as shown by the other columns in the table. As will be immediately apparent from FIG. 1B, it will be appreciated that the latencies may differ significantly for different combinations of cache slice and slave/master node, due to the physical connection of those various elements into the ring network.

Further, with reference to FIG. 1A, in situations where a direct communication path is provided between the master node and the slave nodes, then an extra column can be provided for that master node, to identify the latencies associated with such direct paths between the master mode and the slave nodes.

It should be noted that the latency values do not need to be absolute values, but merely need to be comparative values so that the relative latencies associated with different cache slices can be evaluated. The latency values can be specified in a variety of ways, for example they could be expressed in terms of the distance of the communication path between the two elements for which the latency value applies, or could be specified in terms of the number of clock cycles taken for a communication to transfer between the two elements.

In the example of FIG. 3, it is assumed that the latency is the same in either direction, and hence for example that a communication from the slave node 0 to the L3 cache slice 0 will have the same latency as a communication from the L3 cache slice 0 to the slave node 0. However, as mentioned earlier, the ring network can be arranged in a variety of ways, and could for example be a unidirectional ring rather than a bidirectional ring. In such instances, the latencies may not be the same in each direction, and in that event the lookup table can be expanded so as to capture latency values for both directions between the two corresponding elements.

As will be discussed in more detail later, when determining latency indications for each cache slice, a decision can be taken as to whether a hit latency should be considered or a miss latency should be considered. For example, referring to FIG. 1A, and assuming a request was issued by slave node 0, it will be appreciated that the hit latency is the latency involved in a communication from slave node 50 to the relevant L3 cache slice, and then a response from that cache slice back to the slave node 50. Assuming the latency value is the same in each direction, then the hit latency is as expressed in FIG. 3.

For a miss latency, it will depend on the path taken for the response. In particular, as mentioned earlier, in the event of a miss then the request will need to be propagated on from the cache slice to the relevant master node, which will then communicate with the slave device in order to obtain the required data. The required data can then be routed back through the cache slice in one example implementation, but alternatively may be able to be provided directly back from the master node to the slave node. Hence, as shown in FIG. 3, the miss latency can be computed in different ways, dependent on whether direct transfer support between the master node and the slave node is supported or not. Again, for the purposes of FIG. 3, it is assumed that the latencies are the same in each direction.

Figure 4:
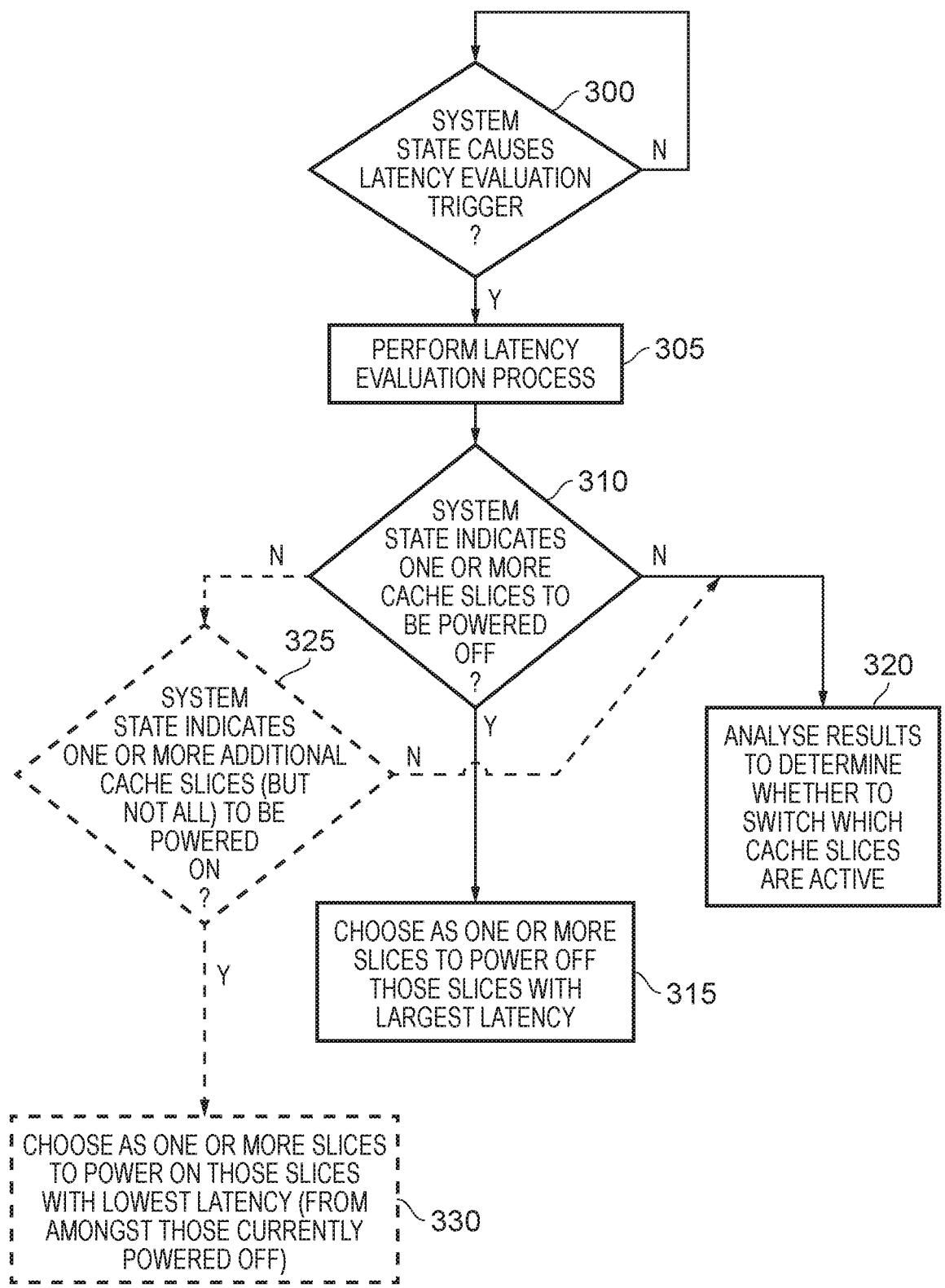
FIG. 4 is a flow diagram illustrating an operation performed by the slice power controller of FIG. 1A in accordance with one example arrangement.

FIG. 4 is a flow diagram illustrating the operation of the slice power controller 70 in one example implementation. As mentioned earlier, the slice power controller 70 can receive system state information indicative of the current state of the system. This system state information may be provided by various hardware elements within the system, and/or by software being executed within the system. Hence, by way of example, the system state information can identify when a processing device, (for example one or more of the master devices 10, 20) is turned off or on, or when such a processing device changes its power state. In addition, or alternatively, the system state information may include information about current workload characteristics which could for example be indicative of the extent to which the cache 60 is being utilised, the hit rate within that cache, etc. Alternatively, software executing on the system may analyse such information and provide as the system state information an indication that the cache may be able to be placed in a power saving mode where one or more of the cache slices can be turned off, or even in situations where one or more of the cache slices has already been turned off, such information may indicate when it is appropriate to re-evaluate the latency indications since it may be that a different constellation of cache slices should be used.

Accordingly, at step 300, the process waits until the system state information received by the slice power controller 70 indicates a latency evaluation trigger. When that occurs, the process proceeds to step 305 where a latency evaluation process is performed. The process performed here can take a variety of forms, and various examples will be discussed hereafter with reference to FIGS. 5 to 7 and 10.

The process then proceeds to step 310 where it is determined whether the system state that caused the latency evaluation trigger indicated that one or more cache slices was now to be powered off. For example, the system state may indicate that the cache can be operated in a more power saving state than it currently is in, and may identify, or be used to identify, the number of cache slices to be turned off. In that event, the process proceeds to step 315 where the one or more cache slices chosen to be powered off are those slices with the largest latency indication.

If at process 310 it is determined that the system state does not indicate that one or more cache slices should be powered off, then the process can proceed to step 320. In particular, in one example implementation the no path may indicate that the system state merely identified that it was worth re-evaluating the latency in order to determine whether a more appropriate constellation of cache slices to remain powered on can be found. For example, it may be that there is no need to change the total number of cache slices powered, but that given a change in the system it may be likely that a different constellation of cache slices would be more efficient.

In that event, at step 320 the results from the latency evaluation process are analysed to determine whether to switch which cache slices are active. When making this decision, it will typically be appropriate to consider the potential power consumption savings that could be realised as a result of making the switch, but also consider the cost implications of making the switch. In particular, there will typically be a power cost associated with turning off certain cache slices and turning other cache slices on. In order to determine whether that cost should be incurred, in one example implementation the power consumption savings that are likely to be realised once the switch has been made will be considered. Additional factors that can be considered would be length of time that the system is likely to stay in the current state, the frequency with which the cache is being accessed, etc. In general, it will be appreciated that some heuristics and hysteresis can be employed when deciding whether it is worthwhile switching one or more cache slices at step 320, i.e. turning one or more off and turning the corresponding number on.

In one specific implementation, two modes are supported. Firstly, all of the cache slices of the cache 60 may be turned on, or alternatively, as a power saving mode, all but one of those cache slices will be turned off. Accordingly, once the power saving mode is exited, it is merely the case that all of the cache slices will be turned back on. Hence, in such an implementation, at step 310 it is merely needed to be determined whether the system state has indicated that the cache should be migrated from the situation where all cache slices are on to the situation where only a single cache slice is on, and then at step 315 it is determined, using the results of the latency evaluation process, which cache slice has the lowest latency, and that is the cache slice that remains powered on.

In the alternative, it may be that the system state has merely indicated that it is appropriate to re-evaluate whether the single cache slice that is on is the most appropriate cache slice or whether, as a result of performing the latency evaluation process, that indicates that a different cache slice should be the single cache slice that remains powered, and in that event the process will proceed to step 320.

However, in a more general implementation, it may be that there are multiple different power saving modes for the cache, each of which requires a different number of cache slices (but not all of the cache slices) to be powered on. In that instance, the system state may also indicate situations where it is necessary to increase the number of cache slices that are powered, whilst still remaining in a power saving mode where not all of the cache slices are powered. In that event, the process of FIG. 4 can be adapted as shown by the dotted lines, and the steps 325, 330. In particular, at step 310, the no path no longer transitions directly to step 320, but instead transitions to step 325 where it is determined whether the system states indicates that one or more additional cache slices (but not all cache slices) should be powered on. If so, then the process proceeds to step 330 where the one or more additional slices to be powered on are chosen to be those with the lowest latency. Hence, if two additional cache slices were to be powered on, then the two from amongst those that are currently powered off that have the lowest latency may be chosen to be powered on.

If the no path is followed from step 325, then the process can proceed to the earlier-discussed step 320.

Figure 5:
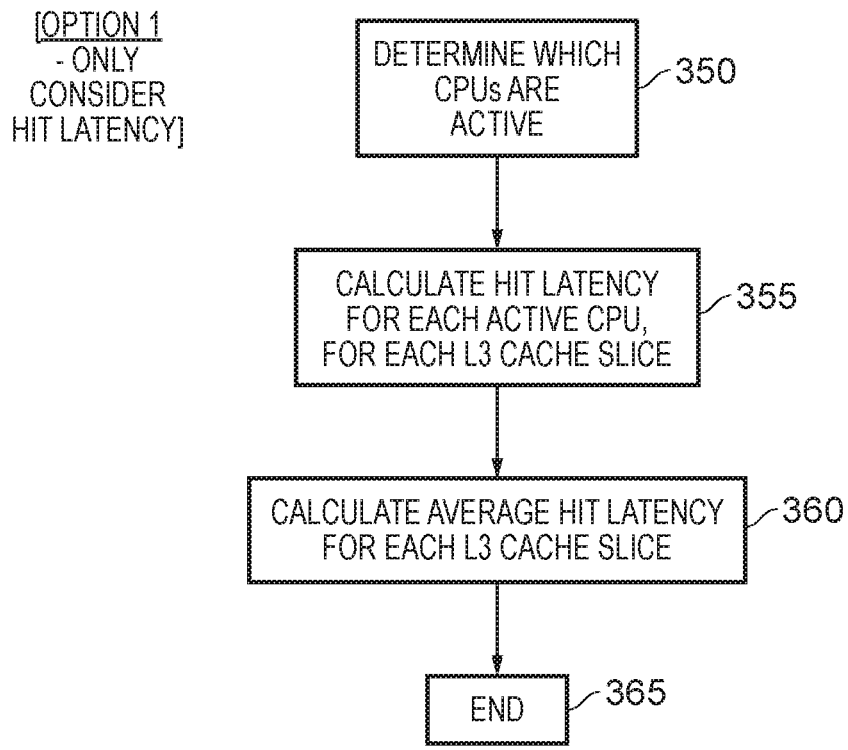
FIG. 5 is a flow diagram illustrating a sequence of steps that can be used to implement step 305 of FIG. 4 in accordance with a first example arrangement.

As discussed earlier, the latency evaluation process performed at step 305 of FIG. 4 can take a variety of forms. In one example arrangement, the process of FIG. 5 is employed, and in particular in this example only hit latency is considered. At step 350, it is determined which data processing units (in this example CPUs) are active within the system and hence which slave nodes will currently be utilised to issue requests to the level 3 cache. Then, at step 355 a hit latency is calculated for each active CPU, for each cache slice. In one embodiment, this can be achieved by referring to the lookup table 75 in order to obtain the required latency values. Then, at step 360 an average hit latency for each L3 cache slice can be calculated. Hence, by way of example, if both slave node 0 and slave node 1 are in use (based on the active CPUs), then an average of the latency values associated with those slave nodes for each cache slice can be determined. Following step 360, the process then ends at step 365, and in particular the remainder of the process discussed earlier with reference to FIG. 4 will then be performed.

Figure 6:
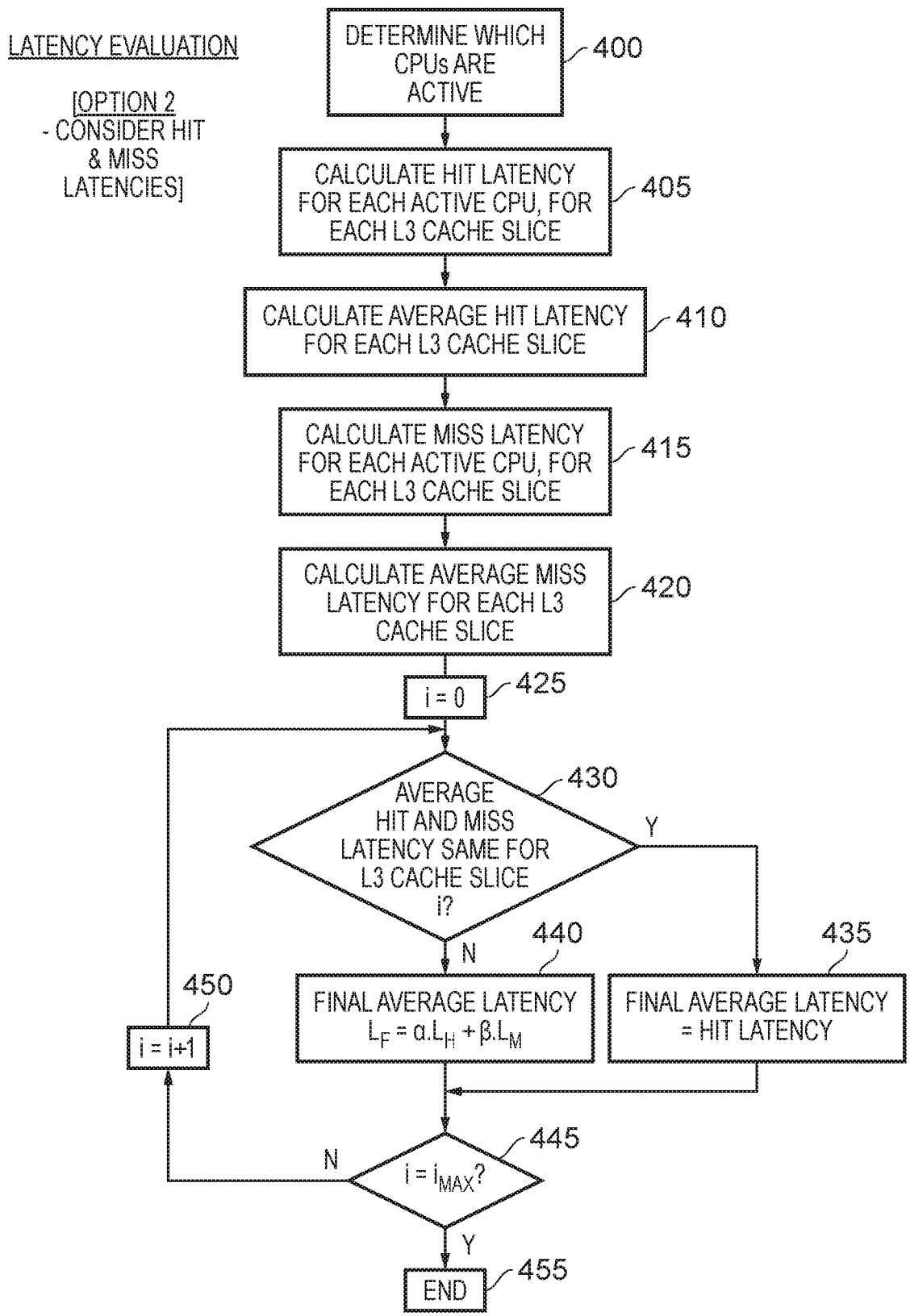
FIG. 6 is a flow diagram illustrating a sequence of steps that can be used to implement step 305 of FIG. 4 in accordance with an alternative example arrangement.

FIG. 6 is a flow diagram illustrating an alternative latency evaluation process, where both hit latencies and miss latencies are considered. At step 400, it is determined which CPUs are active, and then at step 405 the hit latency for each active CPU, for each L3 cache slice, is calculated. Then, at step 410 an average hit latency is calculated for each cache slice.

At step 415, a miss latency is then calculated for each active CPU, for each L3 cache slice, and then at step 420 an average miss latency is calculated for each cache slice.

At step 425, a parameter i is set equal to 0, and then at step 430 it is determined whether the average hit latency and the average miss latency are the same for cache slice i. If that is the case, then the final average latency is determined to be the hit latency at step 435. However, if the average hit and miss latencies differ, then at step 440 a final average latency is determined by performing a weighting operation. In particular, the final latency is formed by a weighted addition of the average hit latency and the average miss latency. The factors $\alpha$ and $\beta$ shown in step 440 used to define the weights applied to the average hit latency and the average miss latency, respectively, may in one example arrangement be fixed, or alternatively could be varied dynamically, for example based on the cache hit rate. For instance, if the cache had a relatively high hit rate, the weighting could be biased towards the average hit latency and less towards the average miss latency, whereas conversely if there was a significantly high miss rate, then the weighting could be biased the other way so as to bias the final average latency more towards the average miss latency than the average hit latency.

At step 445, it is determined whether the parameter i has reached a maximum value, i.e. indicating that all cache slices have been considered. If not, then i is incremented at step 450, and the process returns to step 430. However, once all cache slices have been considered, then the process ends at step 455, whereafter the remainder of the process of FIG. 4 is performed.

Figure 7:
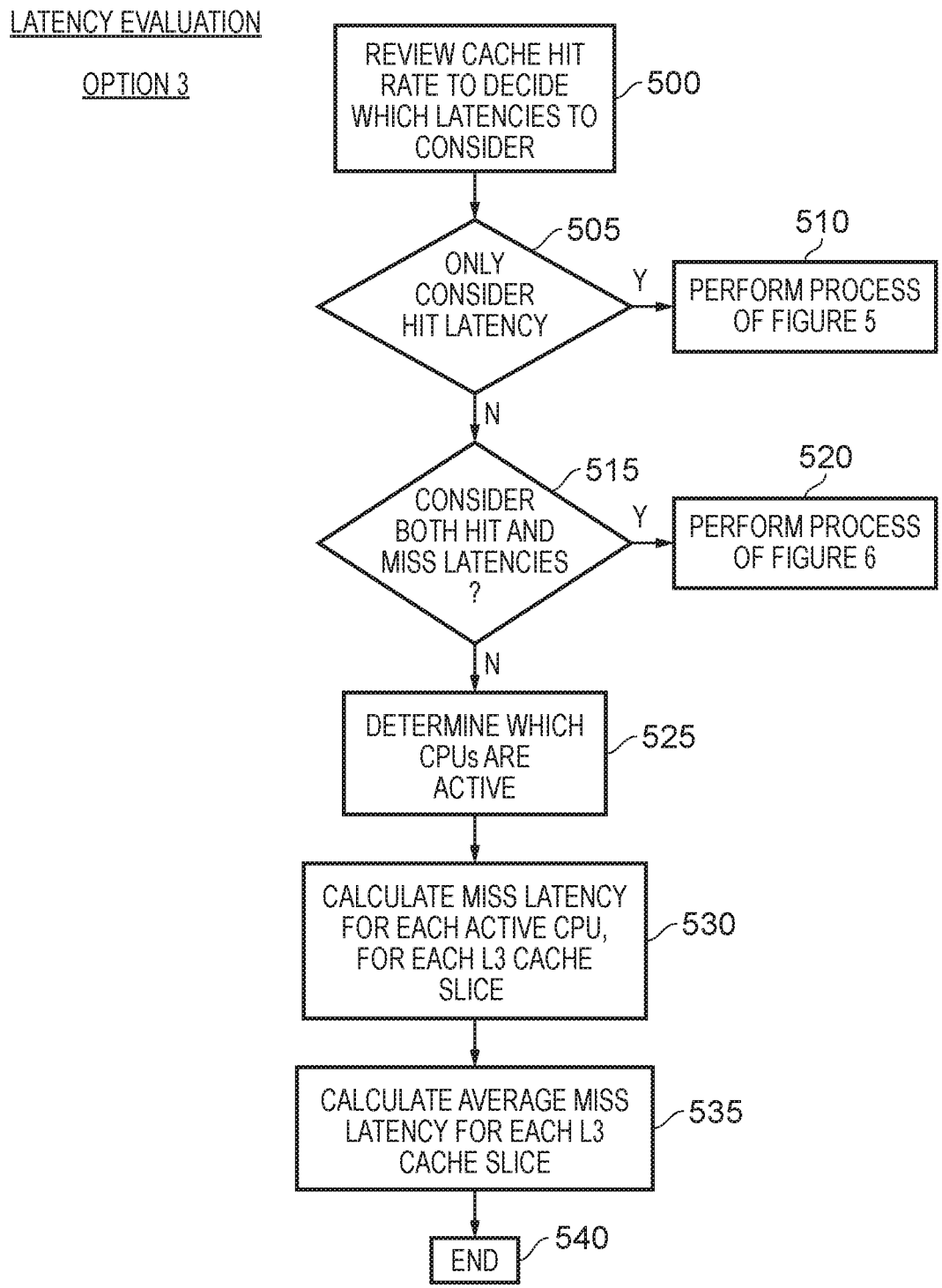
FIG. 7 is a flow diagram illustrating a sequence of steps that can be used to implement step 305 of FIG. 4 in accordance with a still further alternative example arrangement.
Figure 8A:
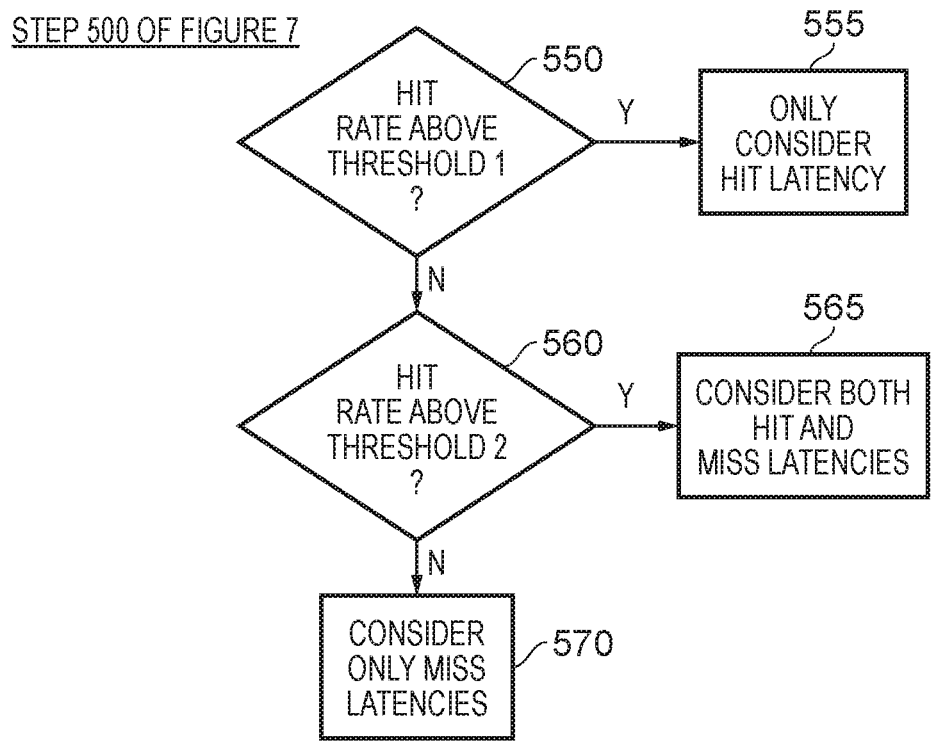
FIG. 8A is a flow diagram illustrating how step 500 of FIG. 7 may be implemented in one example arrangement.

FIG. 7 illustrates a yet further alternative implementation of the latency evaluation process, where cache hit rate is used to decide which latencies to consider. At step 500, the cache hit rate is reviewed in order to decide which latencies to consider, and in particular at this point the process illustrated in FIG. 8A may be utilised. As shown in FIG. 8A, if the hit rate is above a first determined threshold, then it may be determined at step 555 to only consider hit latency. However, if the hit rate is not above this first threshold, it may be determined at step 560 whether the hit rate is above a second threshold. If so, then at step 565 both hit and miss latencies may be considered, whereas otherwise the process will proceed to step 570 where only miss latencies are considered.

Figure 8B:
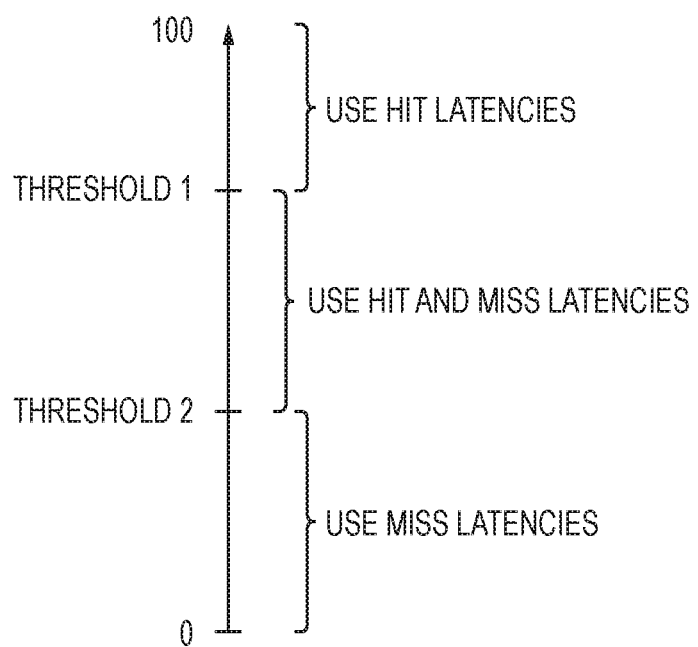
FIG. 8B schematically illustrates the thresholds referred to in FIG. 8A, in accordance with one example arrangement.

FIG. 8B schematically illustrates the two thresholds discussed above, which may for example be expressed in percentage terms between 0 and 100. As shown in FIG. 8B, hit latencies are used when the threshold exceeds threshold 1, miss latencies are used when the threshold is below threshold 2, and between threshold 1 and threshold 2 both hit and miss latencies are used.

Returning to FIG. 7, following the review at step 500, it is then determined at step 505 whether the review process at step 500 has determined that only hit latencies should be considered. If so, then in one example the earlier-discussed process of FIG. 5 is employed at step 510.

However otherwise, it is determined at step 515 whether both hit and miss latencies should be considered, and if so the process proceeds to step 520, where the earlier-discussed process of FIG. 6 may in one example be employed.

However, if the no path is followed from step 515, then from the earlier-discussed FIG. 8A it will be appreciated that at this point it has been decided to only consider miss latencies. Hence, at step 525 it is determined which CPUs are active, and then at step 530 a miss latency indication is calculated for each active CPU, for each L3 cache slice. Then, at step 535 an average miss latency is calculated for each cache slice, whereafter the process ends at step 540. At this point, the remainder of the process of FIG. 4 will be employed.

Figure 9:
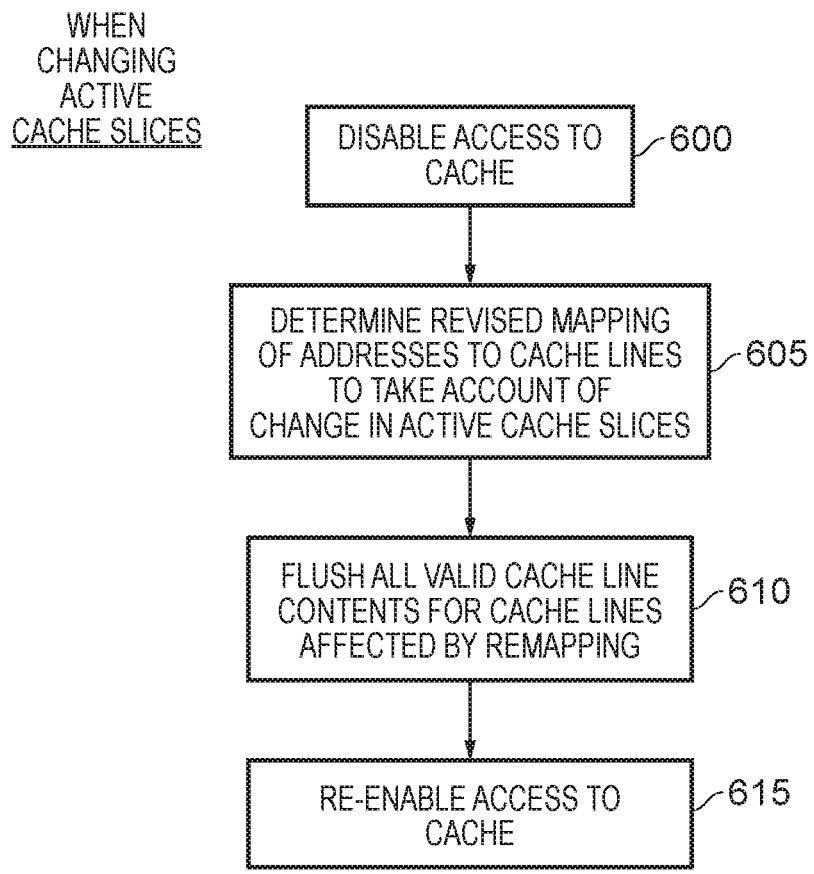
FIG. 9 is a flow diagram illustrating steps that may be performed when changing the number of active cache slices as a result of performing the techniques described herein.
Figure 10:
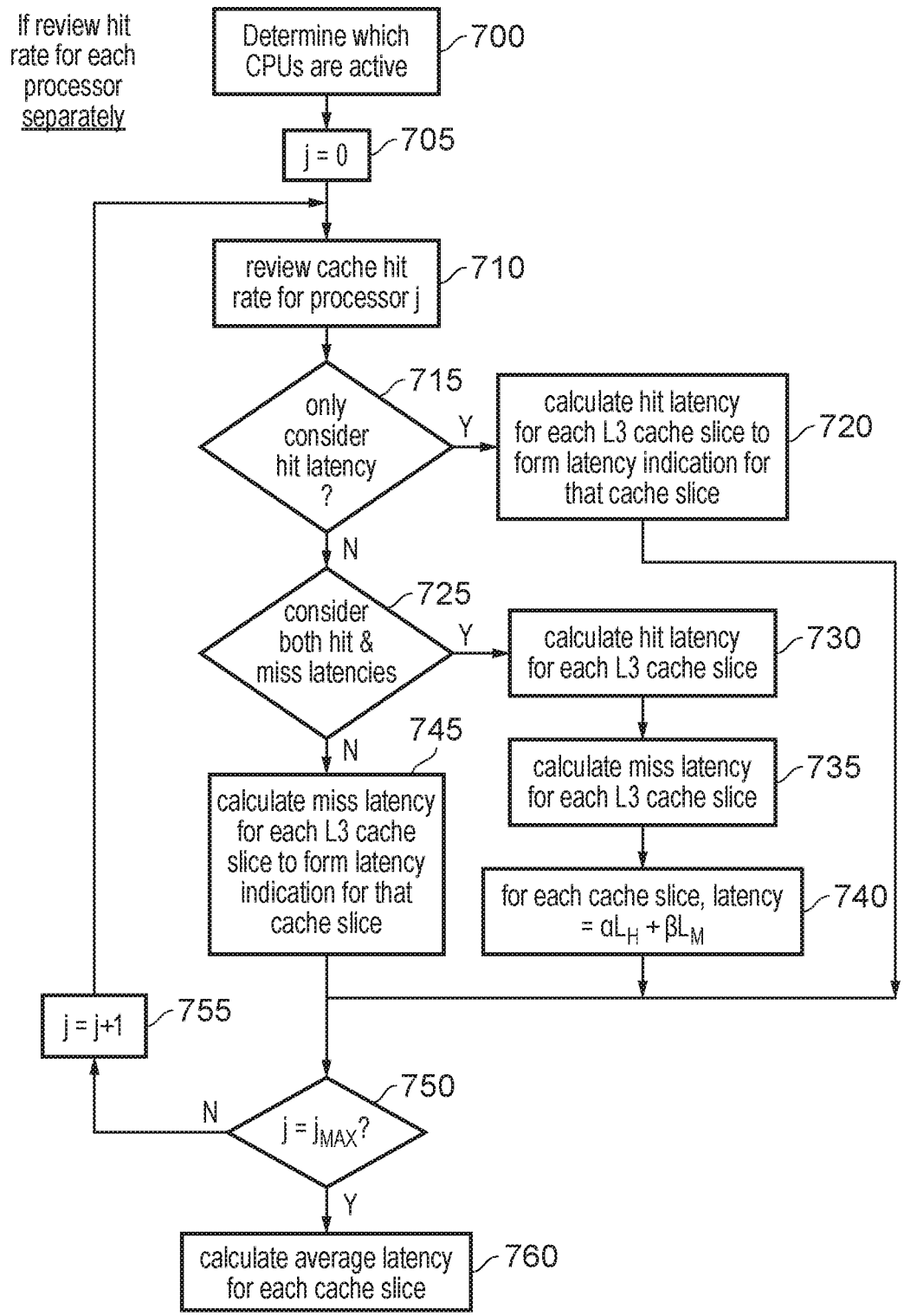
FIG. 10 is a flow diagram illustrating an alternative technique to that discussed earlier with reference to FIG. 7, that may be used to perform the latency evaluation step 305 of FIG. 4.

FIG. 9 is a flow diagram illustrating steps performed when, as a result of the latency evaluation process, it is determined by the slice power controller 70 to alter which cache slices are powered. At step 600, access to the cache is temporarily disabled. Then, at step 605 a revised mapping of addresses to the various cache lines of the cache is determined in order to take account of the change being made to the cache slices that are to be powered. For example, if a cache slice is to be turned off, then any addresses that would have mapped to that cache slice instead need to be mapped to a different cache slice.

At step 610, all valid cache line contents for cache lines that are affected by the remapping are then flushed to memory in the example shown in FIG. 9. Hence, for a cache slice that is to be turned off, all valid cache lines within that cache will be flushed. However, dependent on how the revised mapping is determined, it may also be necessary to flush cache lines from one or more of the cache slices that are to remain powered, if the mapping as revised will mean that the address no longer maps into that cache line. It should be noted however that, in other implementations, flushing to memory may not be required. For example, it may be possible to move the contents of certain cache lines between slices rather than flushing that content to memory.

Following step 610, then at step 615 access to the cache is re-enabled.

The process of FIG. 9 can be performed whenever the constellation of the cache slices that are to remain powered changes, and hence whenever at least one cache slice is being powered off, or at least one cache slice is being powered on. Whilst at step 610 a determination is made as to which cache lines to flush, based on whether they are affected by the remapping, in an alternative implementation a simple approach that could be adopted would be to flush the entire cache whenever such a change was being made. This step can be performed either when decreasing the number of active cache slices, or increasing the number of active cache slices.

When discussing FIG. 7 earlier, at step 500 a cache hit rate was considered, and in that example an overall cache hit rate for the cache was considered, i.e. the cache hit rate was not CPU specific. However, in an alternative implementation the various cache hit rates as observed by the different active CPUs could instead be considered, and in that event an alternative way of performing the latency evaluation process may be implemented, for example using the process illustrated in FIG. 10.

At step 700, it is determined which CPUs are active, and then at step 705 a parameter j is set equal to 0. Then, at step 710 the cache hit rate for processor j is reviewed. At this point, a process analogous to that discussed earlier with reference to FIGS. 8A and 8B can be performed, but merely considering the hit rate appropriate for processor j. At step 715, it is then determined whether only the hit latency is to be considered, based on the review that took place at step 710. If so, the process proceeds to step 720, where a hit latency is calculated for each L3 cache slice for the processor currently under consideration. Those hit latency indications then form the latency indication for each cache slice, and the process proceeds to step 750.

However, if at step 715 it is determined that it is not only the hit latency that should be considered, then at step 725 it is determined whether both the hit and miss latencies are to be considered. If so, the process proceeds to step 730 where the hit latency is calculated for each L3 cache slice for the processor in question. Then, at step 735, the miss latency is calculated for each cache slice for the processor in question. Thereafter, at step 740, for each cache slice a weighted latency indication is produced. As discussed earlier with reference to step 440 of FIG. 6, the weights applied to the hit and miss latencies may be fixed, or alternatively could be dynamically altered dependent on the hit rate. In contrast to the approach adopted in FIG. 6, where average hit and miss latencies were being considered, it will typically be expected that the hit and miss latencies will not be the same here, since no averaging has occurred, and accordingly there is no need to determine whether the hit and miss latencies are the same before proceeding to step 740. Following step 740, the process proceeds to step 750.

If at step 725 it is determined that both hit and miss latencies should not be considered, then the process proceeds to step 745. At this point, only the miss latency is being considered, and accordingly a miss latency is calculated for each cache slice for the processor in question, that miss latency being used to form the latency indication for each cache slice. At step 750, it is determined whether j has reached a maximum value, i.e. whether all active CPUs have been considered, and if not j is incremented at step 755 and the process returns to step 710. Once all processors have been considered, then the process proceeds to step 760 where the average latency is then calculated for each cache slice by using the various latency indications computed during the multiple iterations of steps 710 to 750. Thereafter, the remainder of the process of FIG. 4 can be performed.

By performing the techniques described herein, the leakage power associated with caches can be significantly reduced, which can enable energy consumption savings to be achieved. When deciding to alter the cache slices that are powered, the latency evaluation process can be used to determine a latency indication for each of the cache slices, and thereby make a decision as to which cache slices to power off dependent on those latency indications. This enables a dynamic decision to be made as to which cache slices to keep active, based on system state information such as which CPUs are active, and on the relative physical locations of the various cache slices with respect to those active CPUs.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a cache comprising a plurality of cache sections, where each cache section is powered independently of the other cache sections in said plurality of cache sections; and
power control circuitry to control power to each of the cache sections;
wherein the power control circuitry is responsive to a trigger condition indicative of an ability to operate the cache in a power saving mode, to perform a latency evaluation process to determine a latency indication for each of the cache sections, and to control which of a subset of the cache sections to power off in dependence on the latency indication, wherein:
the cache is accessible to a plurality of data processing units,
the power control circuitry is arranged to take into account which of the plurality of data processing units are active when determining the latency indication for each of the cache sections, and
in determining the latency indication for each of the cache sections, the power control circuitry is arranged to determine whether to take into account a hit latency indication for each cache section for each of the active processing units, a miss latency indication for that cache section for each of the active processing units, or both the hit latency indication and the miss latency indication, dependent on a hit rate observed for the cache.

2. An apparatus as claimed in claim 1, wherein when more than one data processing unit is active, the power control circuitry is arranged to determine, as the latency indication for each of the cache sections, an average latency indication for each cache section taking into account a latency indication for that cache section for each active data processing unit.

3. An apparatus as claimed in claim 1, wherein during the latency evaluation process the power control circuitry is arranged to determine, as the latency indication for at least one cache section, a weighted latency indication for that cache section that is based on both the hit latency indication and the miss latency indication for that cache section.

4. An apparatus as claimed in claim 3, wherein a weighting between the hit latency indication and the miss latency indication is fixed.

5. An apparatus as claimed in claim 3, wherein a weighting between the hit latency indication and the miss latency indication is dependent on the hit rate observed for the cache.

6. An apparatus as claimed in claim 4, wherein:
the power control circuitry is arranged, when determining the latency indication for each cache section, to take into account both the hit latency indication and the miss latency indication for that cache section when the hit latency indication differs from the miss latency indication.

7. An apparatus as claimed in claim 1, further comprising:
a storage to store a latency value indicative of a latency between each cache section and each of the plurality of data processing units; and
the power control circuitry is arranged to reference the storage when determining the latency indication for each of the cache sections.

8. An apparatus as claimed in claim 7, wherein:
the cache is provided within an interconnect providing a plurality of slave nodes, where each of the data processing unit is connected to an associated slave node; and
the storage is arranged to store, as the latency value indicative of the latency between a cache section and a data processing unit, a value indicating the latency between that cache section and the slave node to which that data processing unit is connected.

9. An apparatus as claimed in claim 7, wherein:
the interconnect further comprises a master node to couple the interconnect to a slave device used to process a miss request from the cache;
the storage is further arranged to store a latency value indicative of a latency between each of the cache sections and the master node; and
the power control circuitry is arranged to reference the storage to take into account, when determining a miss latency indication associated with a cache section and a data processing unit, both the latency value indicative of the latency between that data processing unit and that cache section and the latency value indicative of the latency between that cache section and the master node.

10. An apparatus as claimed in claim 9, wherein:
the interconnect provides a direct path from the master node to each of the slave nodes for the provision of data obtained by the master node following a cache miss in the cache;

the storage is arranged to store a latency value indicative of a latency of each direct path; and the power control circuitry is arranged to reference the storage to take into account, when determining the miss latency indication associated with a cache section and a data processing unit, the latency value indicative of the latency between that data processing unit and that cache section, the latency value indicative of the latency between that cache section and the master node, and the latency value indicative of the latency of the direct path provided for that data processing unit.

11. An apparatus as claimed in claim 1, wherein the trigger condition identifies that a transition should be made from operating the cache in a current mode to operating the cache in the power saving mode, where the number of cache sections to be employed differs between the current mode and the power saving mode.

12. An apparatus as claimed in claim 11, wherein the current mode is also a power saving mode where at least one cache section is powered off.

13. An apparatus as claimed in claim 11, wherein:
in the current mode all cache sections are powered on, and in the power saving mode only one cache section is powered on; and
the power control circuitry is arranged to perform the latency evaluation process to determine which cache section to remain powered on in the power saving mode.

14. An apparatus as claimed in claim 1, wherein:
the cache is already operating in the power saving mode at the time the trigger condition occurs, and the trigger condition occurs due to a change in system state indicating that the power control circuitry should re-perform the latency evaluation process in order to determine whether to make a change to the cache sections forming the subset of the cache sections that are powered off in the power saving mode.

15. An apparatus as claimed in claim 14, wherein the power control circuitry is arranged to determine, at least in the presence of a qualifying condition, to make the change when re-performance of the latency evaluation process identifies that a latency reduction can be achieved by making the change.

16. An apparatus as claimed in claim 15, wherein the power control circuitry has access to cost information indicative of a cost associated with performing the change, and the qualifying condition is determined to be present when the cost is below a threshold.

17. An apparatus as claimed in claim 16, wherein the threshold is dependent on the latency reduction that can be achieved by making the change.

18. An apparatus as claimed in claim 1, wherein the cache is an N-way set associative cache, and each of the cache sections comprises a plurality of sets, where each set comprises an entry in each of the N ways.

19. A method of managing a cache comprising:
arranging the cache as a plurality of cache sections, where each cache section is powered independently of the other cache sections in said plurality of cache sections;
employing power control circuitry to control power to each of the cache sections; and
responsive to a trigger condition indicative of an ability to operate the cache in a power saving mode, performing a latency evaluation process to determine a latency indication for each of the cache sections, and causing the power control circuitry to control which of a subset of the cache sections to power off in dependence on the latency indication, wherein:
the cache is accessible to a plurality of data processing units,
the power control circuitry takes into account which of the plurality of data processing units are active when determining the latency indication for each of the cache sections, and
in determining the latency indication for each of the cache sections, determining whether to take into account a hit latency indication for each cache section for each of the active processing units, a miss latency indication for that cache section for each of the active processing units, or both the hit latency indication and the miss latency indication, dependent on a hit rate observed for the cache.

20. An apparatus comprising:
means for providing a plurality of cache sections within a cache, where each cache section is powered independently of the other cache sections in said plurality of cache sections; and
power control means for controlling power to each of the cache sections;
wherein the power control means, responsive to a trigger condition indicative of an ability to operate the means for providing in a power saving mode, for performing a latency evaluation process to determine a latency indication for each of the cache sections, and for controlling which of a subset of the cache sections to power off in dependence on the latency indication, wherein:
the means for providing is accessible to a plurality of data processing means,
the power control means is arranged to take into account which of the plurality of data processing means are active when determining the latency indication for each of the cache sections, and
in determining the latency indication for each of the cache sections, the power control means is arranged to determine whether to take into account a hit latency indication for each cache section for each of the active data processing means, a miss latency indication for that cache section for each of the active data processing means, or both the hit latency indication and the miss latency indication, dependent on a hit rate observed for the cache.

* * * * *